(12) United States Patent
Taenzer et al.

(10) Patent No.: US 6,445,799 B1
(45) Date of Patent: *Sep. 3, 2002

(54) NOISE CANCELLATION EARPIECE

(75) Inventors: Jon C. Taenzer, Los Altos; Steven H. Puthuff, Saratoga; Vincent Pluvinage, Atherton, all of CA (US)

(73) Assignee: GN Resound North America Corporation, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/832,508

(22) Filed: Apr. 3, 1997

(51) Int. Cl.⁷ .......................... H03B 29/00; H04R 25/00
(52) U.S. Cl. ...................... 381/71.6; 381/381; 381/382
(58) Field of Search .............................. 381/71.6, 71.1, 381/72

(56) References Cited

U.S. PATENT DOCUMENTS

| | | | |
|---|---|---|---|
| 4,420,657 A | * 12/1983 | Larkin | 381/189 |
| 4,473,906 A | 9/1984 | Warnaka et a | 381/71 |
| 5,182,774 A | * 1/1993 | Bourk | 381/71.6 |
| 5,452,361 A | 9/1995 | Jones | 381/71 |
| 5,606,607 A | 2/1997 | Yamaguchi | 379/430 |
| 5,606,621 A | 2/1997 | Reiter et al. | 381/68.6 |
| 5,721,783 A | 2/1998 | Anderson | |
| 5,740,258 A | 4/1998 | Goodwin-Johansson | |
| 5,987,146 A | * 11/1999 | Pluvinage et al. | 381/328 |

OTHER PUBLICATIONS

"MicroStamp Engine™, Modulated Backscatter (MBS) Version" Preliminary Data Sheet, Product Brochure, Micron Communications, Inc., 1996, 18 Pages.

* cited by examiner

Primary Examiner—Forester W. Isen
Assistant Examiner—Brian Pendleton
(74) Attorney, Agent, or Firm—McCutchen, Doyle, Brown & Enersen, LLP; David G. Beck

(57) ABSTRACT

A communications earpiece comprises an ear canal tube sized for positioning in an ear canal of a user so that the ear canal is at least partially open for directly receiving ambient sounds. A microphone port in the ear canal tube is located in the ear canal for detecting sounds in the ear canal. A speaker port in the ear canal tube is located in the ear canal in close proximity to the microphone port for broadcasting sound signals into the ear canal. A sound processor amplifies the ambient sounds received by the microphone to produce processed analog signals. The sound processor also comprises noise cancellation means for producing an inverse noise signal of noise detected in the ear canal by the microphone. The inverse noise signal is sent to the speaker port so as to be broadcast into the ear canal thereby substantially canceling the ambient noise in the ear canal.

44 Claims, 6 Drawing Sheets

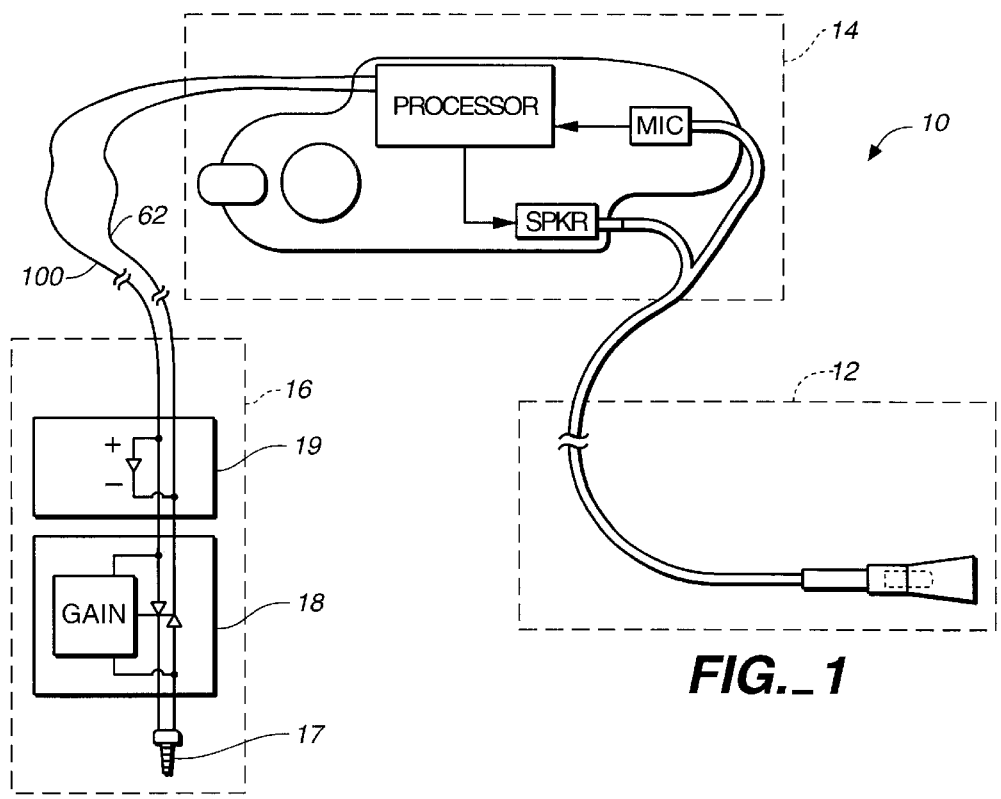
FIG._1
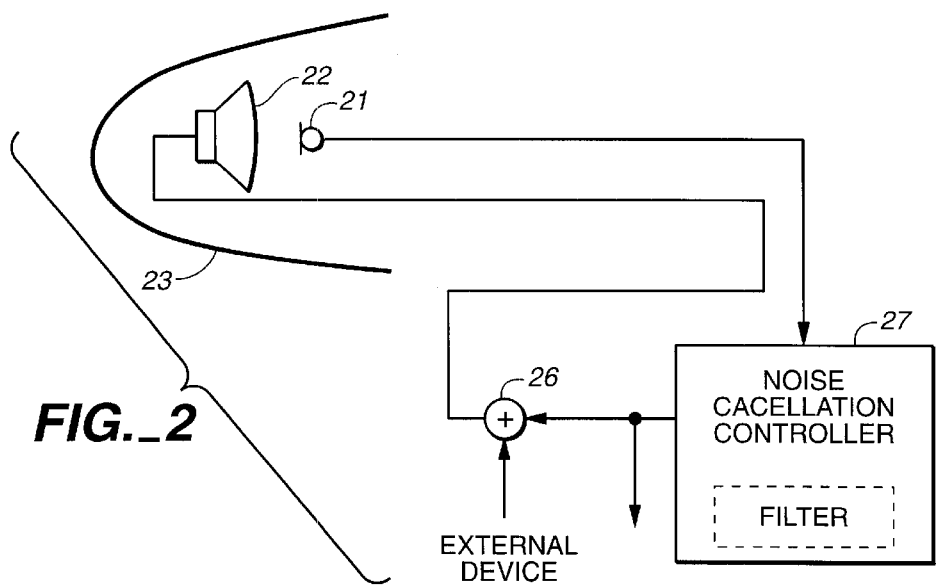
FIG._2

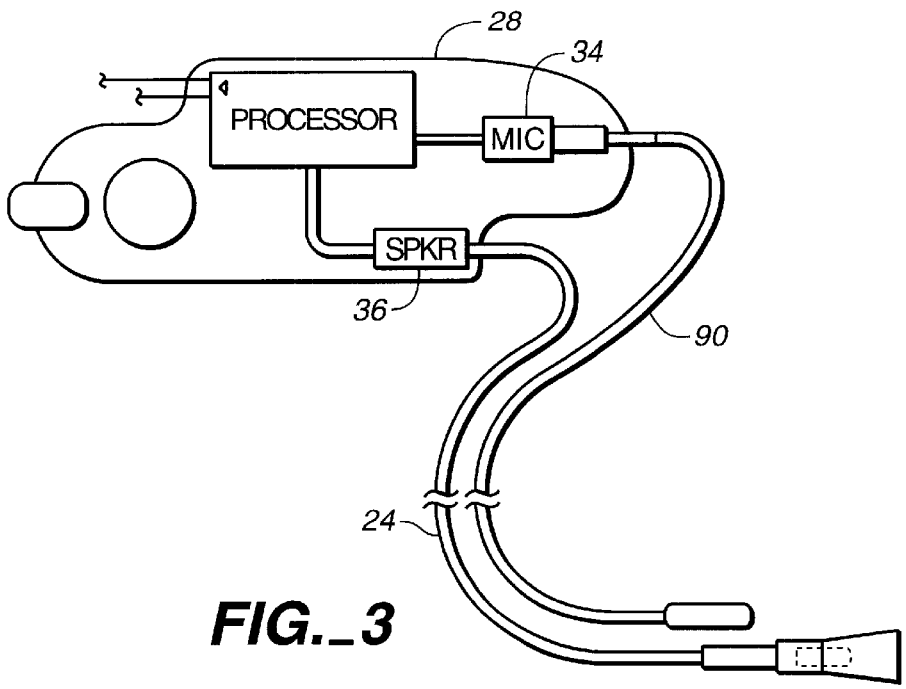
FIG._3
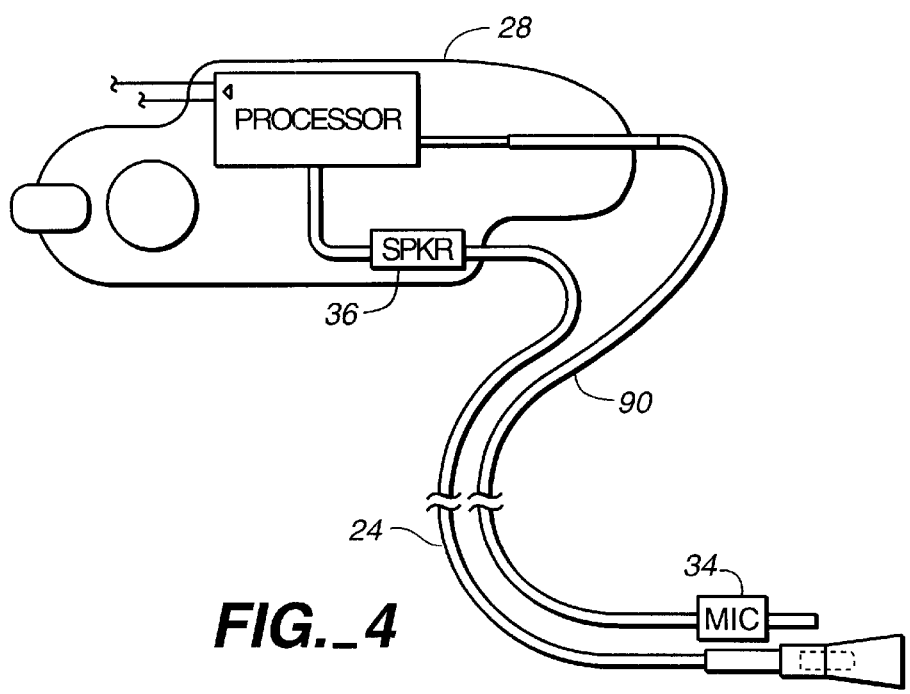
FIG._4

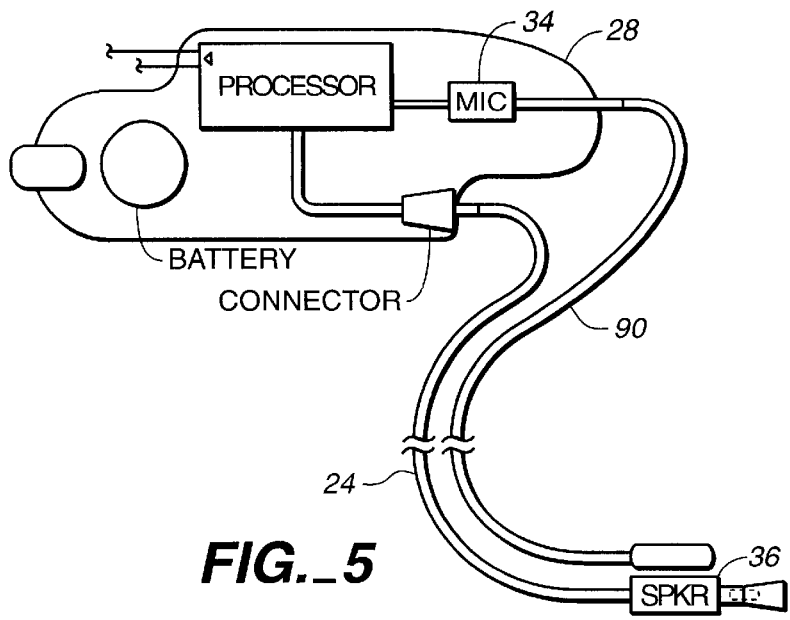
FIG._5
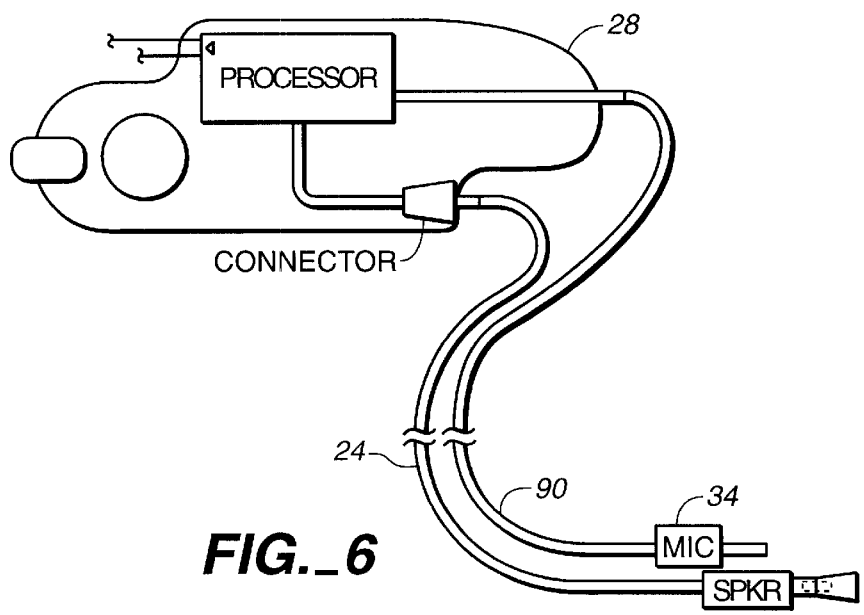
FIG._6
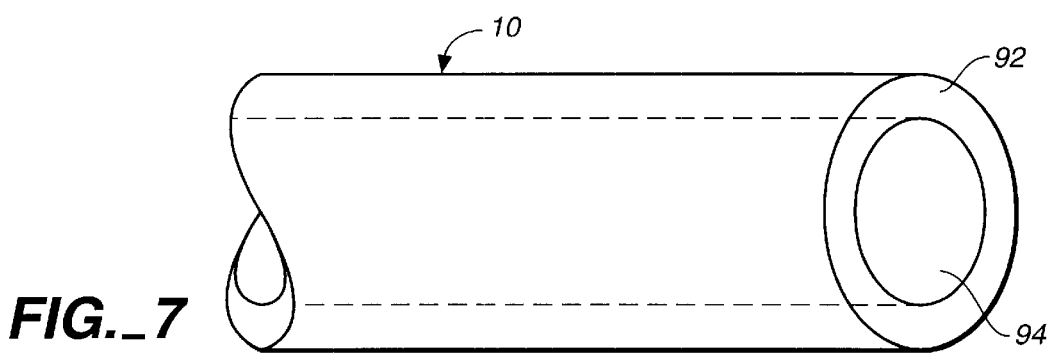
FIG._7

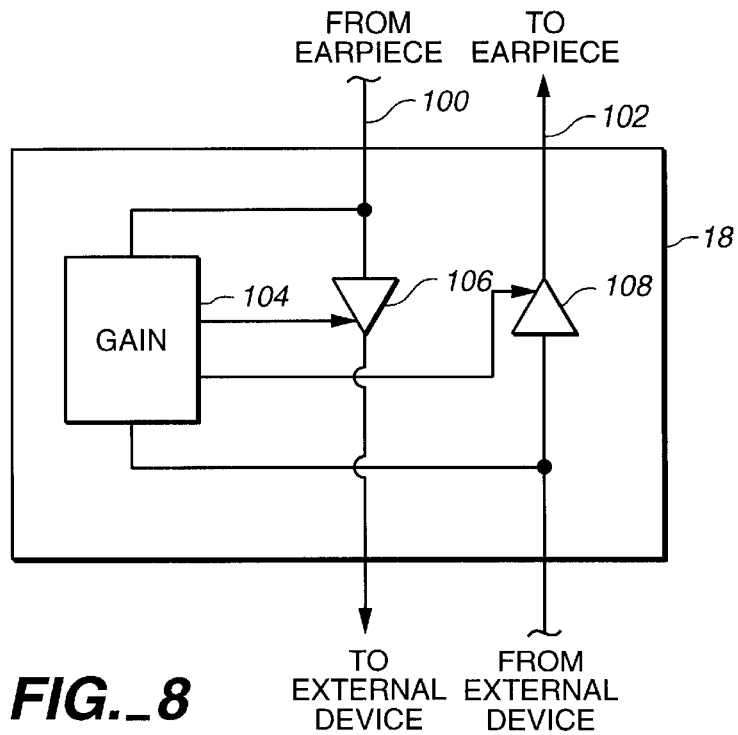
FIG._8
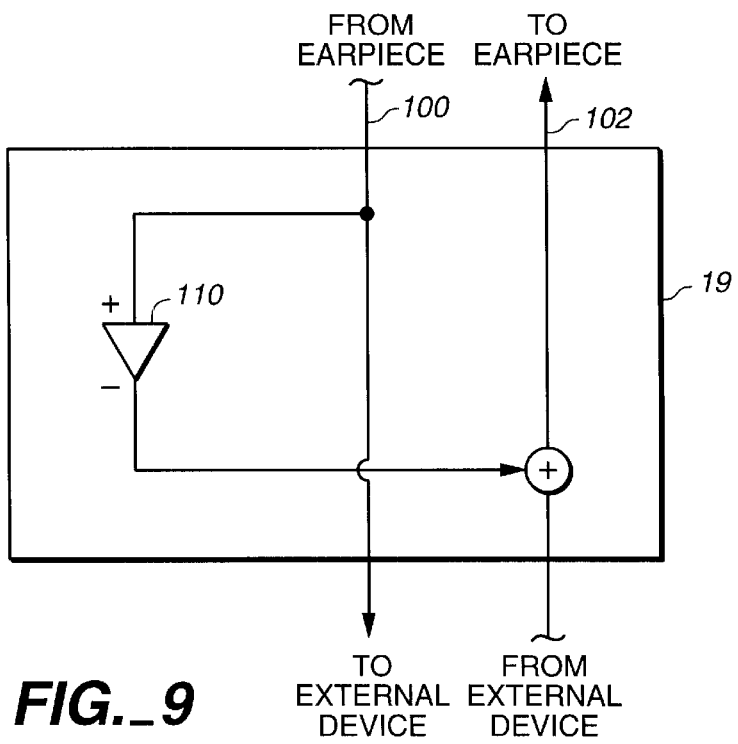
FIG._9

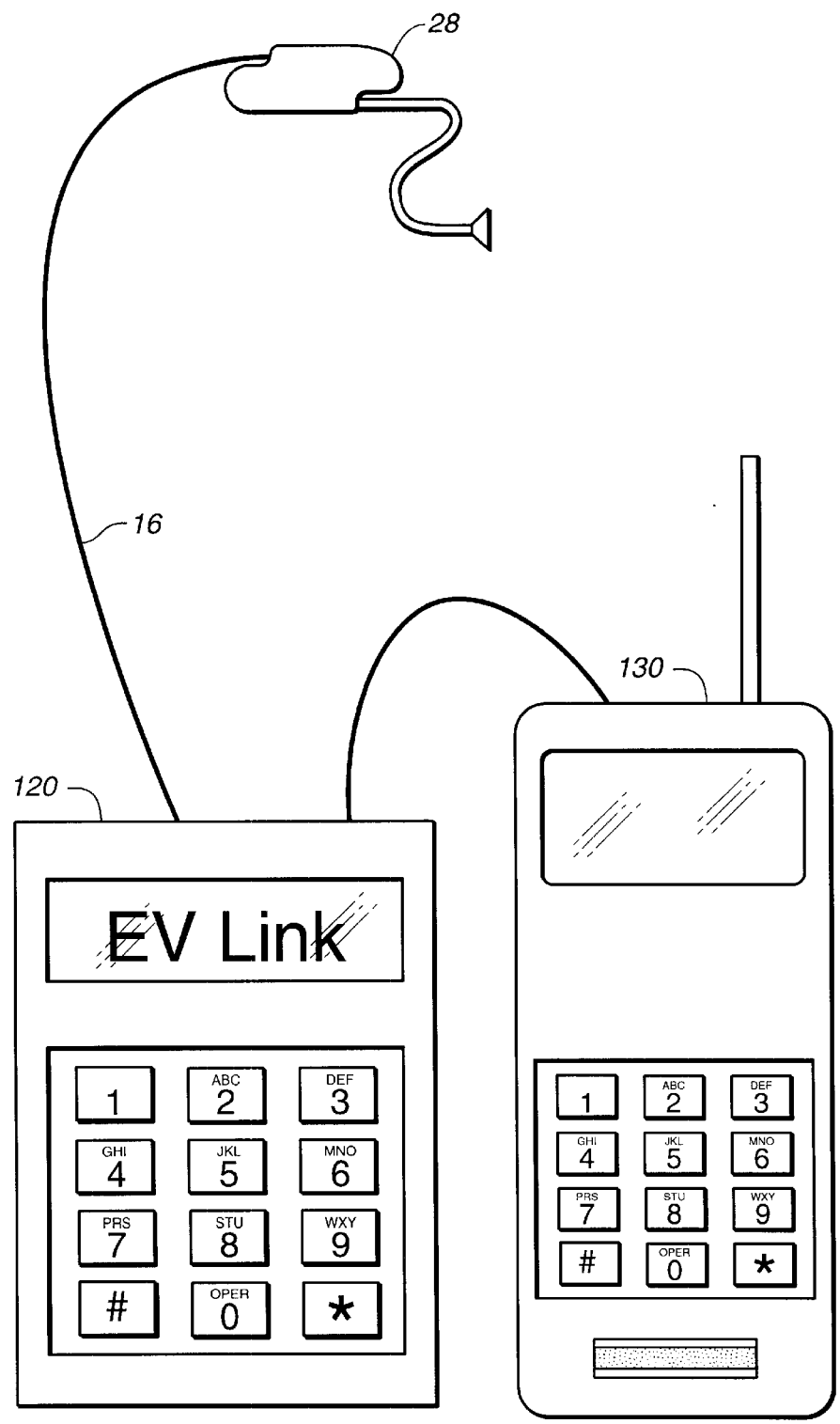
FIG._10

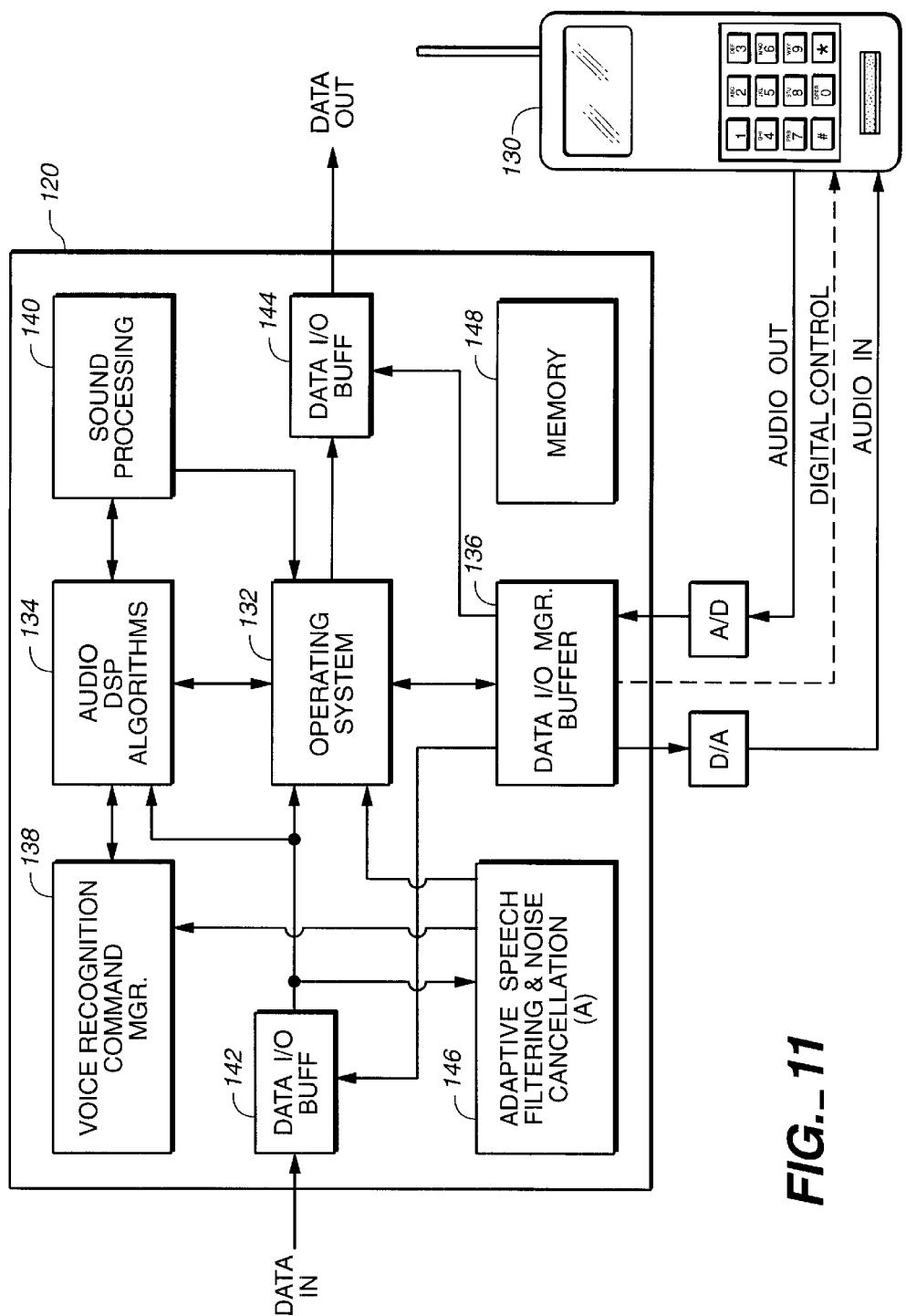
FIG._11

NOISE CANCELLATION EARPIECE

BACKGROUND OF THE INVENTION

1. Field of the Invention

The present invention relates to a communications earpiece and more particularly to an open ear canal earpiece which is capable of cancelling noise present in an ear canal.

2. State of the Art

In various circumstances ambient noise can interfere with transmission and receipt of sound information. U.S. Pat. No. 4,473,906, which is incorporated herein by reference, discloses an active noise cancellation headset which involves connecting the output of a microphone to the input of a speaker via an inverting operational amplifier. The output of the microphone is connected to the inverting input of the operational amplifier, and the non-inverting input of the operational amplifier is grounded. An area around the microphone constitutes a "closed volume." The microphone and speaker are placed in close proximity to one another so that the speaker is within the closed volume area around the microphone.

In operation, any ambient noise in the closed volume is sensed by the microphone. This output is amplified and inverted by the operational amplifier, and then used to drive the speaker to create an equal and opposite ambient noise which is then supplied back to the microphone. The microphone includes a diaphragm which is moved in response to the ambient noise. The output from the speaker creates an equal and opposite pressure on the microphone diaphragm which counteracts the ambient noise. In other words, the output of the microphone is servoed by feedback from the speaker to the zero condition at the non-inverting input of the operational amplifier.

The advantage of this circuit is that it is a virtual earth active noise cancellation system which does not require phase or amplitude tuning. Rather, the only requirement is that the speaker be placed within the closed volume of the microphone to establish a uniform pressure throughout the closed volume and a zero output condition from the operational amplifier.

The noise cancellation technology of the '906 patent can experience some problems when low frequency high intensity sounds are detected by the microphone. The noise cancellation system will attempt to cancel this noise by driving the speaker to create an equal and opposite pressure on the microphone diaphragm. However, because the speaker can not be driven at such levels without distorting, the low frequency high intensity noise is not cancelled. Furthermore, when the speaker is driven to such an extent, the speaker will create audible noise which exacerbates the noise problem.

U.S. Pat. No. 5,452,361, which is also incorporated herein by reference, constitutes an improvement of the basic noise cancellation technology described in the '906 patent. The '361 patent addresses this overload condition by removing very low frequencies which are inaudible.

A typical hearing aid system involves either an ear canal device, which completely plugs the ear or the use of a behind-the-ear ear device which connects to an ear mold that completely plugs the ear. In both cases, the entire ear canal is blocked to create a closed volume space within the ear canal. Such a small space can be pressurized using a relatively small speaker driver and speaker, since the volume of air that must be moved by the speaker diaphragm to cancel low frequency sounds is relatively small. Because hearing aid systems typically include closed volume space, the relatively small speakers of a typical hearing aid system can be used to reasonably effectively cancel noise in the ear canal.

Although active noise cancellation has been known, it has been previously considered inappropriate for use in open volume applications, such as an open canal hearing aid system, wherein the volume in which the microphone is located is not a closed space. When any portion of the ear canal is open to the ambient air, a small speaker driver can no longer generate the movement of air necessary to cancel low frequency noise.

Noise cancellation bandwidth is a function of the frequencies of the noise to be canceled, the amplitude of those frequencies and the volume of air within which noise cancellation is to be implemented. The cross-over point where effective noise cancellation can be provided decreases, (that is the frequencies for which noise cancellation can be provided expands to include a lower range of frequencies) as the controlled volume becomes smaller. If the controlled volume is increased by opening the ear canal, the frequencies for which effective noise cancellation can be provided increases. For example, noise having a frequency of 50 Hz, has a half wavelength of approximately 10 feet. As such, an open volume with a diameter of nearly 10 feet must be filled with the required cancellation pressure in order to effectively cancel the noise. In other words, the driver must move air for a distance of 10 feet. This is impractical for a hearing aid speaker, which must be configured small in size.

Because of the foregoing difficulties associated with noise cancellation and open volumes, conventional hearing aid systems limited any use of noise cancellation to closed canal systems. Thus, conventional open canal earpieces do not provide for noise cancellation because the driver and speaker which would be required would far exceed the size and power constraints of a typical earpiece.

SUMMARY OF THE INVENTION

According to an exemplary embodiment of the present invention, an open canal communications earpiece with noise cancellation is disclosed. The communications earpiece comprises an ear canal tube sized for positioning in an ear canal of a user so that the ear canal is at least partially open for directly receiving ambient sounds. A microphone port in the ear canal tube is located in the ear canal for detecting sounds in the ear canal. A speaker port in the ear canal tube is located in the ear canal for broadcasting sound signals into the ear canal. A sound processor amplifies the ambient sounds received by the microphone to produce processed analog signals. The sound processor also comprises noise cancellation means for producing an inverse noise signal of noise detected in the ear canal by the microphone. The inverse noise signal is sent to the speaker port so as to be broadcast into the ear canal, thereby substantially canceling the ambient noise in the ear canal.

According to an alternate embodiment, the communications earpiece can be configured to fit entirely in the ear canal of the user so long as the ear canal is partially open for receiving ambient sound.

BRIEF DESCRIPTION OF THE DRAWINGS

These and other objects will be fully understood from the description below and the accompanying drawings, in which:

FIG. 1 illustrates an open ear canal earpiece according to an exemplary embodiment of the present invention;

FIG. 2 illustrates an open ear canal earpiece with noise cancellation according to an exemplary embodiment of the present invention;

FIGS. 3–7 illustrate earpiece systems according to exemplary embodiments of the present invention;

FIG. 8 illustrates an auto-balancing circuit according to an exemplary embodiment of the present invention;

FIG. 9 illustrates an anti-feedback circuit according to an exemplary embodiment of the present invention;

FIG. 10 illustrates an exemplary remote processing unit which can be used in conjunction with exemplary embodiments of the present invention; and FIG. 11 illustrates the remote processing unit of FIG. 9 in greater detail.

DETAILED DESCRIPTION OF THE PREFERRED EMBODIMENTS

Speech can be divided into several components: vowels; and consonants. Vowels tend to have greater intensities than consonants. In addition, vowels tend to have frequencies below 1000 Hz while consonants tend to have frequencies above 1000 Hz. The intelligibility of speech depends more on the intelligibility of the consonant sounds than vowel sounds. Low frequency, high intensity noise can decrease the intelligibility of speech signals by masking the consonant sounds. Thus, to increase the intelligibility of speech signals, the noise (which, for purposes of this discussion, corresponds to any undesired and/or unwanted signal) in the frequency band which happens to include the vowel sounds, (for example, 200–1000 Hz or any other specified frequency range), needs to be cancelled. While this exemplary cancellation does cancel some of the vowel sounds, the intelligibility of the speech signal increases because the noise which was masking the consonant sounds has been substantially reduced. Since very low frequency noise (for example, below 200 Hz or any other specified low frequency range) does not need to be cancelled, a relatively small speaker driver and speaker can be used to create enough air pressure for noise cancellation in an open ear canal system.

FIG. 1 illustrates an open ear canal earpiece which can be used as a hearing aid/communications device. The earpiece 10 is comprised of three main sections: an ear tube section 12; a sound processing section 14; and a connector 16 which can be used to electronically connect the earpiece to different electronic devices. The ear tube section 12 is sized for positioning in the ear of a user so that the ear canal is at least partially open for directly receiving ambient sounds. It will be understood that the connector can either be a wired connector or a wireless connector as set forth in copending U.S. patent application Ser. No. 08/833,064, filed Apr. 3, 1997, entitled "Wired Open Ear Canal Earpiece" and U.S. patent application Ser. No. 08/833,068, filed Apr. 3, 1997, entitled "Wireless Open Ear Canal Earpiece" both of which are incorporated herein by reference and were filed on even date herewith.

FIG. 2 illustrates an open ear canal earpiece with noise cancellation according to an exemplary embodiment of the present invention. A speaker port 22 is located in close proximity to a microphone port 21 so as to be in the local volume area of the microphone 21, both of which are located in an ear canal 23.

As will be explained below with reference to FIGS. 3–6, the microphone and speaker of FIG. 1 are in operative communication with the ear tube. For example, the microphone and speaker can both be located inside the ear canal and/or can be located outside the ear canal wherein the sound ports for one or both devices are located in the canal and the sounds propagate to and from the microphone and speaker a single ear canal tube or through separate ear canal tubes (one tube for the microphone and one tube for the speaker) as described in U.S. patent application Ser. No. 08/832,507, filed Apr. 3, 1997, entitled "Ear Canal Microphone", the contents of which are incorporated herein by reference and was filed on even date herewith.

It will be understood by those skilled in the art that the earpiece can be configured to fit in the ear canal so long as the canal is at least partially open for receiving ambient sounds. For example, referring to FIG. 7, the earpiece 91 can be shaped like an open cylinder with thick walls 92, wherein the opening 94 in the middle of the cylinder allows ambient sound to enter the ear canal and all of the electrical components are located in the walls of the cylinder, but the invention is not limited to such an embodiment.

In operation, the FIG. 2 microphone port 21 picks up noise in the open ear canal of the user. The sounds picked up by the microphone 21 are fed into a noise cancellation controller 27. An exemplary noise cancellation controller is described in U.S. Pat. No. 4,473,906, the contents of which are incorporated herein by reference in their entirety. The sounds picked up by the microphone port 21 can include voice or wanted signals, as well as noise (that is, any undesired or unwanted signal). The sound processing of the earpiece can separate the voice or wanted signals from the noise signals, for example, by looking at the statistics of speech versus the statistics of noise. In order to cancel the noise that is present in the ear canal, the noise cancellation controller 27 filters the received signal, inverts the signal and amplifies the inverted signal in a known manner, for example, as described in U.S. Pat. No. 4,473,906, the contents of which are incorporated herein by reference in their entirety. The amplified inverted signal is then applied to the speaker 22 which broadcasts the inverted noise signal into the ear canal, thereby substantially canceling the noise present in the ear canal. If the earpiece is being used as a hearing aid, the voice signal can be processed in a known manner, for example, as disclosed in U.S. patent application Ser. No. 08/781,714, filed Jan. 10, 1997, entitled "Open Ear Canal Hearing Aid System," filed Jan. 10, 1997, the contents of which are incorporated herein by reference in their entirety, and also applied to the speaker 22 wherein the modified voice signals are broadcast into the ear canal. This arrangement improves the intelligibility of speech by cancelling ambient noise in the ear canal of the user.

In an alternate embodiment, the earpiece can be connected to an external device such as a communications network. In this embodiment, a summer 26 is added to the circuit to add the energy of signals coming from the noise cancellation controller 27 with signals coming from the external device. In this embodiment, the noise cancellation controller 27 frequency tailors the feedback signal such that it is separate from any frequency tailoring performed on the signal from the external device. Thus, the signal from the external device is not significantly affected by the noise cancellation feedback. When the earpiece is connected to the external device, the voice signals picked up by the microphone 21, such as the user's voice, can be sent to the external device so as to create a communications link between the user of the earpiece and the external communications network. This can be performed by configuring the noise cancellation controller to examine the energy in each frequency band of the sound signals received by the microphone and to determine how the energy is varying with time. The frequency bands that have statistics which are characteristic of speech (for example, non-repetitive sound) will then pass through an output to the external device. Alternately, the sound signals can be divided into a plurality of frequency bands, for example, high and low frequency bands, and the low frequency band(s) which contain most of the noise can be filtered out.

Furthermore, the noise cancellation controller can filter out frequencies that would otherwise overload the speaker. For example, the noise cancellation controller 27 can be configured with a digital signal processor which includes a finite impulse response filter or an infinite impulse response filter which removes frequencies that would overdrive the speaker.

According to one embodiment illustrated in FIG. 3, a tube 90 is connected to the input of the microphone 34 and the tube is extended into the ear canal of the user. The open end of the tube 90 located in the ear canal allows sounds in the ear canal to enter the tube and then the sound propagates to the input of microphone 34 located in a case 28 that is external to the ear canal (for example, located behind the ear). A similar tube 24 is used with respect to a speaker 36..

In another embodiment illustrated in FIG. 4, rather than using a tube to deliver the sound to an input of the microphone 34, the microphone is moved from the case 28 to the end of the ear canal tube 90 located in the ear canal. In this embodiment, outputs from the microphone are transferred electrically via a plurality of wires located in the ear canal tube 90 to the case 28 for processing.

Likewise, as illustrated in FIG. 5, the speaker 36 can be moved from the case 28 into the ear canal tube. Alternately, both the microphone and the speaker of the case 28 can be moved into the in-the-canal portion of the earpiece, wherein a plurality of wires (e.g., 3 for the microphone and 3 for the speaker) pass through one or more tubes to the electronic signal processing components located in the case 28, as illustrated in FIG. 6. It will be understood by those skilled in the art that the microphone and speaker can also be located anywhere between the case 28 and the end of the ear canal tube(s).

Referring to FIG. 1, the connector 16 includes a physical connector which is plugged into a jack, for instance a headset jack, in an external device, such as a personal communications node as described in copending application Ser. No. 08/758,365, filed Dec. 3, 1996, entitled "Personal Communication Device", the disclosure of which is hereby incorporated by reference in its entirety or a cellular phone. The connector 16 can also include additional processing circuitry such as an auto balancing circuit 18 and/or an anti-feedback circuit adapter 19. Those skilled in the art will appreciate that all processing need not be at the earpiece; the processing can also be in the connector or in the external device. Alternately, the battery can be in the connector to reduce the weight of the earpiece and/or make it easier to change the batteries or to accommodate a large battery for extended use.

Different types of external devices (for example, cellular phones) have different amplitude levels at the headset jack. For the earpiece to properly communicate with the external device through the headset jack, the amplitude levels of the earpiece and the external device need to match. To make the amplitude levels match, the present exemplary embodiments use the auto balancing circuit 18. An example of an auto balancing circuit is illustrated in FIG. 8.

In FIG. 8, an amplifier 106 is placed on the output line 100, i.e, the line transferring signals from the earpiece to the external device, of the connector 16 and an amplifier 108 is attached to the input line 102, i.e., the line transferring signals from the external network device to the earpiece of the connector 16. A gain controller 104 is used to control the gain of both of the amplifiers until the outputs match the levels required by the sound processing system. Basically, the auto balancing circuit sends a signal into the external network device on the output 100 line and detects the signal coming back on the input 102 line. The auto balancing circuit then adjusts the gain of the amplifiers until the amplitudes of the signals match. It will be understood that other auto balancing circuits can also be used in accordance with the present invention and the invention is not limited to the embodiment disclosed in FIG. 8.

In telephones, including cellular phones, the voice of the user is picked up by the microphone and a portion of the voice signal is fed back to the earpiece so that the user can hear his own voice on the phone. According to exemplary embodiments, when the earpiece is attached to the phone, the portion of the user's voice fed back from the phone will be sent to the speaker and broadcast into the ear canal. If the signal is strong, or the speaker port and the microphone port are very close together, a feedback loop will be created because the microphone will pick up the fed back signal which may result in a whistling noise. In order to cancel out this feedback, an anti-feedback circuit 19, as illustrated in FIG. 9, diverts a portion of the output signal into an inverter 110. The inverter 110 inverts the signal and the inverted signal is summed with the input signal from the phone so as to cancel out the feedback. It will be understood that the summer can be used to provide gain adjustments and the inverter 110 can be used to provide phase and frequency adjustments to properly cancel the feedback. These adjustments can be made at the factory during manufacture or can be made by the user by turning a tuning knob (not illustrated) attached to the anti-feedback circuit adapter 19. Alternately, the adjustments can be made automatically with conventional control circuitry.

Another feedback problem occurs if there is a delay in the transmission link between the two users. During a conversation, the sound of the voice of the other person will be sent into the user's ear canal. That sound can be picked up by the microphone, which then sends the other user's voice back to the other user through the communications network. If there is any delay in the transmission link, a delayed echo will be created. In order to compensate for this echo, another anti-feedback circuit can be added to FIG. 1. In this case, an input test signal is generated and the output signal is compared with the input signal to determine the transfer function that should be used to compensate for the echo problem.

As mentioned above, the earpiece can also be connected to a personal communications node (PCN) as illustrated in FIG. 10. An exemplary personal communications node is described in the above mentioned U.S. patent application Ser. No. 08/758,365. FIG. 11 illustrates a personal communication node according to an exemplary embodiment of the present invention. For illustrative purposes, the PCN 120 is depicted in FIG. 11 as connected to a cellular telephone 130 adapted for connection directly to the PCN 120. The PCN 120 permits a user to control at least one remote device simply by issuing voice commands. PCN 120 recognizes and interprets the voice commands of the user, determines whether the commands are to be sent to a given remote device to which it is connected, and forwards the voice commands to the appropriate remote device, accordingly. For example, the PCN 120 can be connected directly to a cellular phone 130 that is adapted for connection to the PCN. The cellular phone 130 can be used in a normal manner by entering codes via a keypad or in response to voice commands forwarded by the PCN 120. It will be understood by those skilled in the art that a cellular phone without a keypad or display could also be used, and controlled solely by voice commands. Using the PCN 120 connected to the cellular telephone 130, a user can answer calls, initiate calls, receive or send messages and so on, simply by issuing voice commands. Likewise, the PCN can also be hooked up to other electronic devices such as computers, which can be controlled using the voice commands.

Referring to FIG. 11, the PCN 120 processes signals received via the microphone(s) in the earpiece(s) worn by the user. The signals include voice commands to control the cellular telephone 130 as well as voice data to be conducted over the cellular telephone network. The PCN 120 then sends the processed signals to the cellular telephone 130 when the signals relate to a call. The PCN 120 also processes signals from the cellular telephone 130 and transmits these signals via the wired or wireless bidirectional link to the earpiece. To perform these functions, the PCN 120 can include, among other features, an operating system 132, audio digital signal processing (DSP) algorithms 134, a data input/output (I/O) manager buffer 136, a voice recognition command manager 138, a sound processing system 140, data I/O buffers 142 and 144, an adaptive speech filtering and noise cancellation unit 146, and a memory unit 148 and/or any combination or subcombination of these components. It will be understood by those skilled in the art that D/A and A/D converters can also be included if the signals received from the earpiece are analog.

The operating system 132 includes hardware and/or software for scheduling software tasks, handling interrupt request scheduling, data input/output, and allocating memory for various applications in the PCN 120. The sound processing unit 140 includes basic hardware and/or software used, for example, in a hearing aid to enhance signal understanding and intelligibility. The sound processing unit 140 can be implemented with a remote processor, such as that described in copending U.S. patent application Ser. No. 08/479,629, the contents of which are incorporated herein by reference in their entirety. Furthermore, the sound processing unit 140 can be programmed to modify the signals in the same manner as the auto-balancing circuit 18 and the anti-feedback circuit 19 thereby alleviating the need for auto-balancing circuit 18 and the anti-feedback circuit 19. Furthermore, the noise cancellation processing can be performed by the sound processing unit 140.

The voice recognition command manager 138 includes hardware and/or software which interprets voice commands from the user. For example, a voice command can be interpreted as a command to direct the cellular telephone 130 to perform a certain function. The voice recognition command manager 138 can be implemented within a conventional voice recognition software such a Motorola's Lexicus Microbrain or the Voice Dialer, model VCS 2060 of Voice Control Systems, Inc. in Dallas, Tx. The voice recognition command manager 138 is trained ahead of time during a set-up phase to recognize the voice of a specific user. For example, the user simply speaks a series of selected words, and the voice recognition command manager 138 becomes programmed, i.e., trained, in a known fashion to recognize any word spoken by the user based on these selected words. The voice recognition command manager 138 can, for example, be language independent.

The voice recognition command manager 138 matches a voice command to a particular control function in a library or lookup table of memory 148. After matching the voice command to a particular control function and a particular remote device, the voice recognition command manager 138 can issue an appropriate control code to, for example, control gating of commands and/or data to one or more remote devices via the operating system.

The audio DSP algorithms unit 134 provides digital sound processing algorithms for the voice recognition command manager 138 in the sound processing unit 140 under the control of the operating system 132. The audio DSP algorithms unit 134 can be implemented in accordance with features described in U.S. Pat. No. 5,479,522 to Lindeman et al., the contents of which are hereby incorporated by reference in their entirety. The audio DSP algorithm unit 134 can also provide noise cancellation algorithms for the sound processing unit 140.

The data I/O manager buffer 136 temporarily stores data, voice, and control signals. The personal communication device also includes an adaptive speech filtering and noise cancellation unit 146 which enhances signal quality by filtering and cancelling noise in the signal. The adaptive speech filtering and noise cancellation unit 146 can be implemented in accordance with, for example, U.S. Pat. No. 5,140,640 to Graupe et al. and/or U.S. Pat. No. 5,452,361 to Jones entitled "Reduced VLF Overload Susceptibility Active Noise Cancellation Headset" assigned to Noise Cancellation Technology (NCT), the contents of which are incorporated herein by reference in their entireties.

It will be appreciated by those of ordinary skill in the art that the present invention can be embodied in other specific forms without departing from the spirit or essential character thereof. Presently disclosed embodiments are therefore considered in all respects to be illustrative and not restrictive. The scope of the invention is indicated by the appended claims, rather than the forgoing description, and all changes that come within the meaning and range of equivalents thereof are intended to be embraced therein.

What is claimed is:

1. A communications system with noise cancellation, comprising:

an ear tube section including at least one ear canal tube sized for positioning in an ear canal of a user so that the ear canal is at least partially open for directly receiving ambient sounds;

a microphone port in operative communication with said ear tube section for detecting sound in said ear canal;

a speaker port in operative communication with said ear tube section for broadcasting sound signals into said ear canal, the speaker port being operably connected to a speaker transducer positioned outside the ear canal;

a sound processor for amplifying ambient sounds received by said microphone port to produce processed signals, the sound processor being located outside the ear canal;

noise cancellation means for producing an inverse noise signal of noise detected in said ear canal by said microphone port; and means for sending said inverse noise signal to said speaker port to broadcast said inverse noise signal into said ear canal and to substantially cancel the ambient noise in the ear canal.

2. A communications system with noise cancellation according to claim 1, further comprising:

connector means for connecting said communications system to external devices wherein processed signals produced by the sound processor are sent to the external devices through said connector and signals from the external devices are sent to the earpiece through the connector so as to be broadcast by the speaker port.

3. A communications system with noise cancellation according to claim 2, wherein said connector is a wired connector.

4. A communications system with noise cancellation according to claim 2, wherein said connector is a wireless connector.

5. A communications system with noise cancellation according to claim 2, further comprising:
means for adaptively combining signals from the external device and said inverse noise signal prior to being sent to said speaker wherein the signals from the external device remain effectively unaltered.

6. A communications system with noise cancellation according to claim 2, wherein a first signal to noise ratio corresponding to said processed analog signals is larger than a second signal to noise ratio corresponding to the original ambient sound.

7. A communications system with noise cancellation according to claim 1, wherein said noise cancellation means further comprises a filter means for filtering signals in different frequency ranges.

8. A communications system with noise cancellation according to claim 7, wherein said filter means is a finite impulse response filter which removes frequencies which would otherwise overdrive the speaker.

9. A communications system with noise cancellation according to claim 7, wherein said filter means is a infinite impulse response filter which removes frequencies which would otherwise overdrive the speaker.

10. A communications system with noise cancellation according to claim 1, wherein said speaker port is in said ear canal.

11. A communications system with noise cancellation according to claim 1, wherein said microphone port is in said ear canal.

12. A communications system according to claim 2, wherein said noise cancellation means is included within said connector means.

13. A communications system according to claim 2, wherein said noise cancellation means is included within said sound processor.

14. A communications system according to claim 1, wherein said ear tube section comprises two tubes, one tube operably connected to said microphone port and another tube operably connected to the speaker port.

15. A communications system according to claim 1, wherein said ear tube section comprises a single tube.

16. A communications system according to claim 1, wherein said at least one ear canal tube is hollow.

17. A communications system according to claim 1, wherein said at least one ear canal tube contains a wire.

18. The communications system of claim 1, wherein said noise cancellation means produces said inverse noise signal within a frequency range of 200–1000 Hz.

19. The communication system of claim 1, wherein the speaker port is sized greater than the ear tube section.

20. A communications system with noise cancellation, comprising:
a microphone port located in an ear canal for detecting sound in said ear canal;
a speaker port located in said ear canal for broadcasting sound signals into said ear canal, the speaker port being operably connected to a speaker transducer positioned outside the ear canal;
a sound processor for processing ambient sounds received by said micro-phone port to produce processed signals, the sound processor being located outside the ear canal;
noise cancellation means for producing an inverse noise signal of noise detected in said ear canal by said microphone, the noise cancellation means being located outside the ear canal; and
means for sending said inverse noise signal to said speaker port to broadcast said inverse noise signal into said ear canal and to substantially cancel at least a portion of the ambient noise in the ear canal, wherein when the microphone port and speaker port are positioned in said ear of a user, the ear canal is at least partially open for directly receiving ambient sounds and wherein at least one of the ports has a transducer that is located outside the ear canal.

21. A communications system with noise cancellation according to claim 20, further comprising:
connector means for connecting said communications system to external devices wherein processed signals produced by the sound processor are sent to the external devices through said connector and signals from the external devices are sent to the earpiece through the connector so as to be broadcast by the speaker port.

22. A communications system with noise cancellation according to claim 21, wherein said connector is a wired connector.

23. A communications system with noise cancellation according to claim 21, wherein said connector is a wireless connector.

24. A communications system with noise cancellation according to claim 21, further comprising:
means for adaptively combining signals from the external device and said inverse noise signal prior to being sent to said speaker wherein the signals from the external device remain effectively unaltered.

25. A communications system with noise cancellation according to claim 21, wherein a first signal to noise ratio corresponding to said processed analog signals is larger than a second signal to noise ratio corresponding to the original ambient sound.

26. A communications system according to claim 21, wherein said noise cancellation means is included within said connector means.

27. A communications system according to claim 21, wherein said noise cancellation means is included within said sound processor.

28. The communication system of claim 20, wherein said noise cancellation means produces said inverse noise signal within a frequency range of 200–1000 Hz.

29. The communication system of claim 20, wherein the speaker transducer is sized greater than the speaker port and greater than the microphone port.

30. A communications system with noise cancellation according to claim 20, wherein said noise cancellation means further comprises a filter means for filtering signals in different frequency ranges.

31. A communications system with noise cancellation according to claim 30, wherein said filter means is a finite impulse response filter which removes frequencies which would otherwise overdrive the speaker transducer.

32. A communications system with noise cancellation according to claim 19, wherein said filter means is a infinite impulse response filter which removes frequencies which would otherwise overdrive the speaker transducer.

33. A communications system according to claim 20, wherein said inverse noise signal is a sound wave produced by a speaker operably connected to the noise canceling means and wherein said means for sending said inverse noise signal to said speaker port comprises a tube.

34. A communications system according to claim 33, wherein said tube is also used to connect the microphone port to a transducer positioned outside the ear canal, the transducer providing an electronic signal to the sound processor.

35. A communications system according to claim 33, wherein an additional tube is used to connect the microphone port to a transducer positioned outside the ear canal, the transducer providing an electric signal to the sound processor.

36. A communications system with noise cancellation, comprising:
 a microphone port located in an ear canal for detecting sound in said ear canal;
 a speaker port located in said ear canal for broadcasting sound signals into said ear canal;
 a behind-the-ear unit, the behind-the-ear unit including a sound processor for processing ambient sounds received by said microphone port to produce processed signals and including a speaker transducer operably connected to the speaker port; and
 a noise cancellation means for producing an inverse noise signal of noise detected in said ear canal by said microphone, the noise cancellation means being located outside the ear canal; wherein the speaker transducer is adapted to broadcast said inverse noise signal into said ear canal to substantially cancel at least a portion of the ambient noise in the ear canal, wherein when the microphone port and speaker port are positioned in said ear of a user, the ear canal is at least partially open for directly receiving ambient sounds.

37. A communications system according to claim 36, wherein said microphone port is a microphone transducer.

38. A communications system according to claim 36, wherein the behind-the-ear unit includes a microphone transducer operably connected to the microphone port.

39. The communication system of claim 36, wherein said noise cancellation means produces said inverse noise signal within a frequency range of 200–1000 Hz.

40. The communication system of claim 36, wherein the speaker transducer is sized greater than the speaker port and greater than the microphone port.

41. A communications system with noise cancellation, comprising:
 an ear tube section including at least one ear canal tube sized for positioning in an ear canal of a user so that the ear canal is at least partially open for directly receiving ambient sounds;
 a microphone port in operative communication with said ear tube section for detecting sound in said ear canal;
 a speaker port in operative communication with said ear tube section for broadcasting sound signals into said ear canal, the speaker port being operably connected to a speaker transducer positioned outside the ear canal;
 a sound processor for amplifying ambient sounds received by said microphone port to produce processed signals, the sound processor being located outside the ear canal;
 noise cancellation means for producing an inverse noise signal of a portion of the sound detected in said ear canal by said microphone port;
 means for sending said inverse noise signal to said speaker port to broadcast said inverse noise signal into said ear canal and to substantially cancel a first portion of the ambient sounds in the ear canal; and
 means for sending a second portion of the ambient sounds to an external device.

42. The communications system according to claim 41, wherein said inverse noise signal does not affect said second portion of the ambient sounds.

43. The communications system according to claim 41, configured for bi-directional communication with the external device.

44. The communications system according to claim 43, wherein a signal from the external device is broadcast by the speaker port into the ear canal.

* * * * *